United States Patent
Smith

[15] 3,646,849
[45] Mar. 7, 1972

[54] SERVOMECHANISM

[72] Inventor: Trevor Stanley Smith, Birmingham, England

[73] Assignee: Joseph Lucas (Industries) Limited, Birmingham, England

[22] Filed: Feb. 10, 1970

[21] Appl. No.: 10,132

[52] U.S. Cl. ................................91/52, 91/376, 91/416, 91/417
[51] Int. Cl. ................................F15b 9/10, F15b 12/17
[58] Field of Search................91/52, 417, 367, 376, 378, 91/416

[56] References Cited

UNITED STATES PATENTS

| 3,008,455 | 11/1961 | Leduc | 91/417 |
| 3,044,451 | 7/1962 | Morrison | 91/367 |
| 3,491,652 | 1/1970 | Riggs | 91/367 |

*Primary Examiner*—Paul E. Maslousky
*Attorney*—Holman & Stern

[57] ABSTRACT

The invention relates to a fluid-pressure operated servomechanism and includes a piston and an associated control member which combine to form a followup servo. There is additionally provided a further control member, whereby movement of the piston to follow the first control member is possible only if the second control member is within prescribed limits of position relative to the piston.

5 Claims, 1 Drawing Figure

PATENTED MAR 7 1972  3,646,849
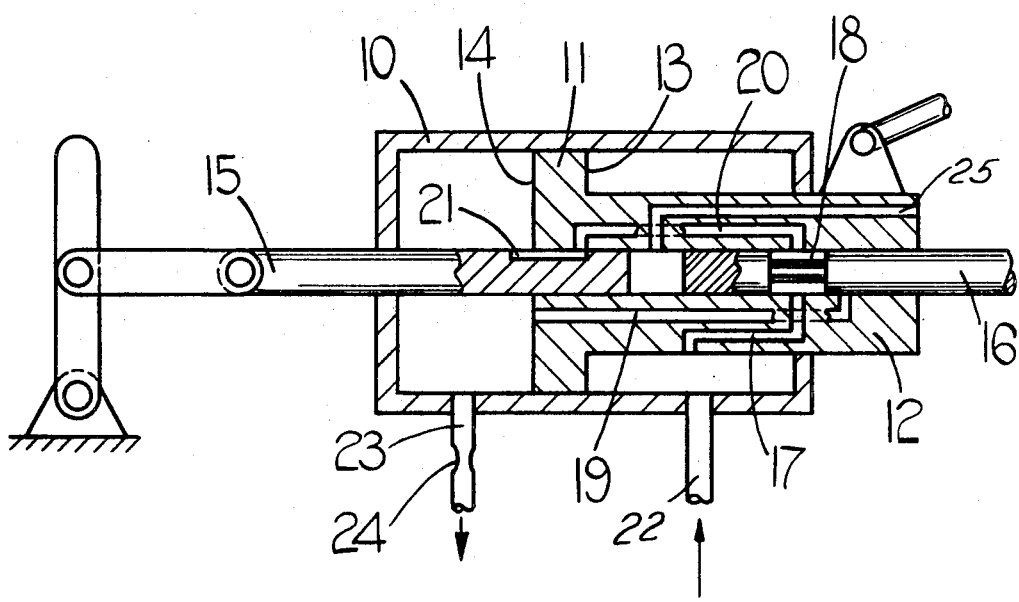
INVENTOR
Trevor Stanley Smith
Holman, Glascock, Downing & Seebold
ATTORNEYS

SERVOMECHANISM

This invention relates to a servomechanism and has as an object to provide a fluid-powered servomechanism for producing an output movement dependent upon two independent input movements.

A servomechanism in accordance with the invention comprises a piston slidable within a cylinder and having a smaller area exposed to the interior of the cylinder on one side than on the other, an inlet for high-pressure fluid to enter the cylinder on the smaller area side of the piston, a pair of input members independently movable in a direction parallel to the direction in which the piston is movable, a pair of passages in the piston connecting the smaller area side thereof to the other side, fluid flow through said passages being controlled, in use, by said input members respectively, and a flow restrictor through which fluid can leave the cylinder on said other side of the piston, the arrangement being such that, in use, the piston is in equilibrium when displaced from a datum position by a distance equal to the displacement of one input member from its datum position, subject to the condition that the piston displacement always remains within prescribed limits of the displacement of the other input member from its datum position.

The accompanying drawing is a diagrammatic section of an example of a servomechanism in accordance with the invention.

The servomechanism shown comprises a cylinder 10 in which a piston 11 is slidable. The piston has, on one side, a piston rod 12 of substantial cross-sectional dimensions projecting through a seal in the end of the cylinder so that the side 13 of the piston has a smaller area exposed to the interior of the cylinder than the other side 14. The piston has an axial through bore into opposite ends of which there extend a pair of plungers 15, 16 forming input members for the servomechanism.

A cross-drilling 17 in the piston rod 16 provides communication between the interior of the cylinder 10 on the side 13 of the piston and the through bore. The plunger 16 has an annular groove 18 into which this drilling 17 opens. There is a passage 19 in the piston which can communicate with the groove 18 and which opens on to the other side 14 of the piston. A second passage 20 in the piston communicates with the groove 18 and opens at its other end into the through bore in the piston adjacent the side 14 thereof. The groove 18 can communicate simultaneously with passages 17, 19, 20 over a limited range of relative positions of the plunger 16 and piston 11. The plunger 15 has a groove 21 which can communicate with the passage 20 and which opens into the cylinder on the side 14 of the piston.

The cylinder 10 has an inlet 22 for high-pressure fluid opening into the cylinder on the side 13 of the piston and an outlet 23 having a flow restrictor 24 on the other side of the piston. A passage 25 extends between the piston bore and a low-pressure zone, to provide a vent for the space between adjacent ends of plungers 15, 16.

In use, the position of the piston 11 in cylinder 10 will be determined by the position of the plungers 15, 16. When the plungers 15, 16 occupy datum positions at the extreme right-hand ends of their travels the piston 11 will likewise occupy a datum position such that there will be flow through passage 22 via passage 17, groove 18, passage 20 and groove 21 to passage 23, such flow being restricted by the coaction of the groove 21 with one end of the passage 20. In this condition the groove 18 is positioned so that the piston 11 may make a slight movement to the left as seen in the drawing, before the groove 18 ceases to communicate with the passage 20. Flow through the restrictor 24 will thus create a pressure in the cylinder which acts upon the side 14 of the piston to balance the higher pressure acting on the smaller area side 13 of the piston. The passage 19 would be closed by the plunger 16. Movement of the plunger 15 to the left, would cause the groove 21 to cover a greater area of the end of the passage 20 thereby reducing the flow through the restrictor 24 and causing the pressure on the left-hand end of the piston to fall. Thus the piston will move to the left, following the plunger 15. Such movement will continue until the passage 19 starts to open into the groove 18 thereby increasing the flow through the restrictor 24 and increasing the pressure on the left-hand end of the piston, bringing the piston to rest at a limiting position of the plunger 16.

If, however, the plunger 16 moves to the left while the plunger 15 is being displaced to the left the plunger 16 will not interfere with the movement of the piston.

A limit to movement of the piston to the right is also set by the plunger 15 since, during movement of the plunger 15 to the right the pressure on the left-hand end of the piston 11 is increased by the uncovering of the end of the passage 20 by the groove 21. Should the piston move beyond the limits set by the plunger 16 the passage 20 will be cut off from communication with the groove 18 thereby reducing the flow through the restrictor 24 and decreasing the pressure on the left-hand end of the piston 11.

The servomechanism described is intended for use in the fuel supply control system of a gas turbine engine reheat system. The plunger 15 is connected to a pilots control whereby the plunger 15 is moved to the left when it is required to increase the flow of fuel to the reheat system. The piston is coupled to a fuel control valve for this purpose. The plunger 16 is connected to a mechanism whereby the area of a nozzle, in the jet pipe downstream of the reheat system is varied.

The plunger 16 moves to the left as the nozzle area increases.

Thus the servomechanism limits the quantity of fuel which can be supplied to the reheat system in accordance with the nozzle, so that fuel flow cannot be increased above the value appropriate to the existing nozzle area. In fact, the nozzle area is set automatically by a servomechanism sensitive to pressures obtaining in the combustion chamber of the engine and in the tailpipe upstream of the nozzle. The slight movement of the piston 11 permitted by the arrangement of the groove 18 and the passage 19 when the plunger 16 is at its datum position allows sufficient fuel to reach the reheat system for the necessary pressure changes to occur to commence opening of the nozzle. The nozzle servo/fuel servo combination thus acts as a scheduling control by limiting the excess fuel margin.

Having thus described my invention what I claim as new and desire to secure by Letters Patent is:

1. A servomechanism comprising a piston slidable within a cylinder and having a smaller area exposed to the interior of the cylinder on one side than on the other, an inlet for high-pressure fluid to enter the cylinder on the smaller area side of the piston, a pair of input members independently movable in a direction parallel to the direction in which the piston is movable, a pair of passages in the piston connecting the smaller area side thereof to the other side, fluid flow through said passages being controlled, in use, by said input members respectively, and a flow restrictor through which fluid can leave the cylinder on said other side of the piston, the arrangement being such that, in use, the piston is in equilibrium when displaced from a datum position by a distance equal to the displacement of one input member from its datum position, subject to the condition that the piston displacement always remains within prescribed limits of the displacement of the other input member from its datum position.

2. A servomechanism as claimed in claim 1 in which the input members cooperate with the piston to provide closure means for the said passages.

3. A servomechanism as claimed in claim 2 in which the piston is formed with an axial bore into which the said passages open and the said input members slidably extend from opposite ends of the said bore.

4. A servomechanism as claimed in claim 3 in which the input members are respectively formed with annular and longitudinal grooves.

5. A servomechanism as claimed in claim 1 in which the arrangement is also such that the piston may be displaced from its datum position while the said other input member remains in its datum position.